US008004451B2

(12) United States Patent
Wu et al.

(10) Patent No.: US 8,004,451 B2
(45) Date of Patent: Aug. 23, 2011

(54) ADAPTIVE MICROWAVE SECURITY SENSOR

(75) Inventors: XiaoDong Wu, Roseville, CA (US); Roy Phi, Elk Grove, CA (US); Dave Eugene Merritt, Rocklin, CA (US)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 12/472,488

(22) Filed: May 27, 2009

(65) Prior Publication Data

US 2010/0302090 A1 Dec. 2, 2010

(51) Int. Cl.
*G01S 13/00* (2006.01)

(52) U.S. Cl. ............................ 342/27; 342/28; 342/205

(58) Field of Classification Search ............. 342/27–28, 342/205

See application file for complete search history.

(56) References Cited

U.S. PATENT DOCUMENTS

| | | | | |
|---|---|---|---|---|
| 4,225,976 | A * | 9/1980 | Osborne et al. | 455/226.3 |
| 5,578,988 | A | 11/1996 | Hoseit et al. | |
| 5,689,249 | A * | 11/1997 | Sakamoto et al. | 340/901 |
| 6,239,736 | B1 | 5/2001 | McDonald et al. | |
| 6,756,936 | B1 | 6/2004 | Wu | |
| 6,780,660 | B2 * | 8/2004 | Hamamura et al. | 438/17 |
| 2002/0060639 | A1 * | 5/2002 | Harman | 342/28 |
| 2002/0175815 | A1 | 11/2002 | Baldwin | |
| 2003/0174088 | A1 * | 9/2003 | Dizaji et al. | 342/93 |
| 2006/0007308 | A1 * | 1/2006 | Ide et al. | 348/143 |

OTHER PUBLICATIONS

European Search Report corresponding to Application No. EP 10 16 3154, dated Aug. 25, 2010.

Napco®, Advanced Adaptive PIR/Microwave Technology Sensor—Installation Instructions.

* cited by examiner

*Primary Examiner* — Thomas H Tarcza
*Assistant Examiner* — Timothy A Brainard
(74) *Attorney, Agent, or Firm* — Husch Blackwell

(57) ABSTRACT

A method and apparatus are provided for operating a microwave detector for detecting intruders within a secured area. The method includes the steps of selecting a noise floor based upon a setting of a range setting potentiometer, detecting a magnitude of a signal reflected from a test subject within the secured area that exceeds the selected noise floor and establishing a threshold value for detecting an intruder based upon the magnitude of the detected signal and sensor mounting height.

16 Claims, 3 Drawing Sheets

MICROWAVE SENSOR WITH DIFFERENT RANGING SETTING

ADAPTIVE MICROWAVE SECURITY SENSOR

FIELD OF THE INVENTION

The field of the invention relates to sensors and more particularly to security sensors.

BACKGROUND OF THE INVENTION

Security sensors for the detection of intrusion are generally known. On a basic level, intrusion detection may be accomplished through the use of window or door switches. On another level, intrusion may be detected in open areas through the use of one or more motion sensors.

The detection of motion may be accomplished via many different types of devices. One type of motion sensor is referred to as a PIR (Passive InfraRed) sensor. PIR sensors operate on the principle that the body temperature of an intruder allows the intruder to stand out from a different temperature background. In this case, the infrared signature of a human intruder may be used to activate an alarm.

Other types may rely upon ultrasound or microwaves. In some cases, the different types of motion detection sensors may be used together (e.g., PIR and microwave).

It is desired in the security field to more reliably detect entry of an intruder into a protected space. A common method of accomplishing this is to use dual technology motion detectors consisting of a Doppler microwave frequency motion detector and a passive infrared (PIR) detector. The PIR detector senses infrared radiation (IR) from the intruder while the Doppler microwave frequency motion detector transmits a microwave frequency signal and detects a change in the return signal due to the presence of an intruder.

The use of PIR and microwave sensors in combination offers a number of advantages over the use of the individual devices by themselves. For example, PIR sensors may not operate very well where an ambient temperature is close to the body temperature of an intruder. On the other hand, microwave sensors have the disadvantage of being able to detect motion outside the protected area.

The combination of the detectors may be used to eliminate false alarms by using the inputs from both types of sensors. In this case the combination may eliminate false alarms due to the microwave motion detector detecting motion outside the protected space or from the microwave detector detecting vibration of an object within the protected space. The combination also eliminates false alarms from a PIR detector due to non-human heat sources such as a heater. Also, the detected Doppler signal from microwave sensor can be used to detect intruders when the ambient temperature is close to the body temperature of intruders.

Microwave sensors require the use of a directional antenna that transmits microwaves across a secured area and receives reflected signals. However, the detected area of a microwave detector is typically larger than the protected area of PIR detector. In order to get best performance, it is necessary to match both microwave and PIR protected areas. In order to do this, it is required to adjust the sensitivity of the microwave sensor. This is a time consuming process. Accordingly, a need exists for better methods of setting up microwave intrusion detectors.

DETAILED DESCRIPTION OF AN ILLUSTRATED EMBODIMENT

This invention has to do with a method for setting a range of microwave intrusion detectors. As is known, prior devices often use a power divider to reduce the output Doppler signal level from a microwave source at the output port of an IF amplifier with a fixed detection threshold. However, this has the negative impact of reducing the dynamic range of the reflected Doppler signal and degrades the microwave detection pattern especially at low microwave frequency bands (e.g., in the S and X frequency bands). In addition, the look-down performance becomes very poor at minimum range setting.

Figure 1:
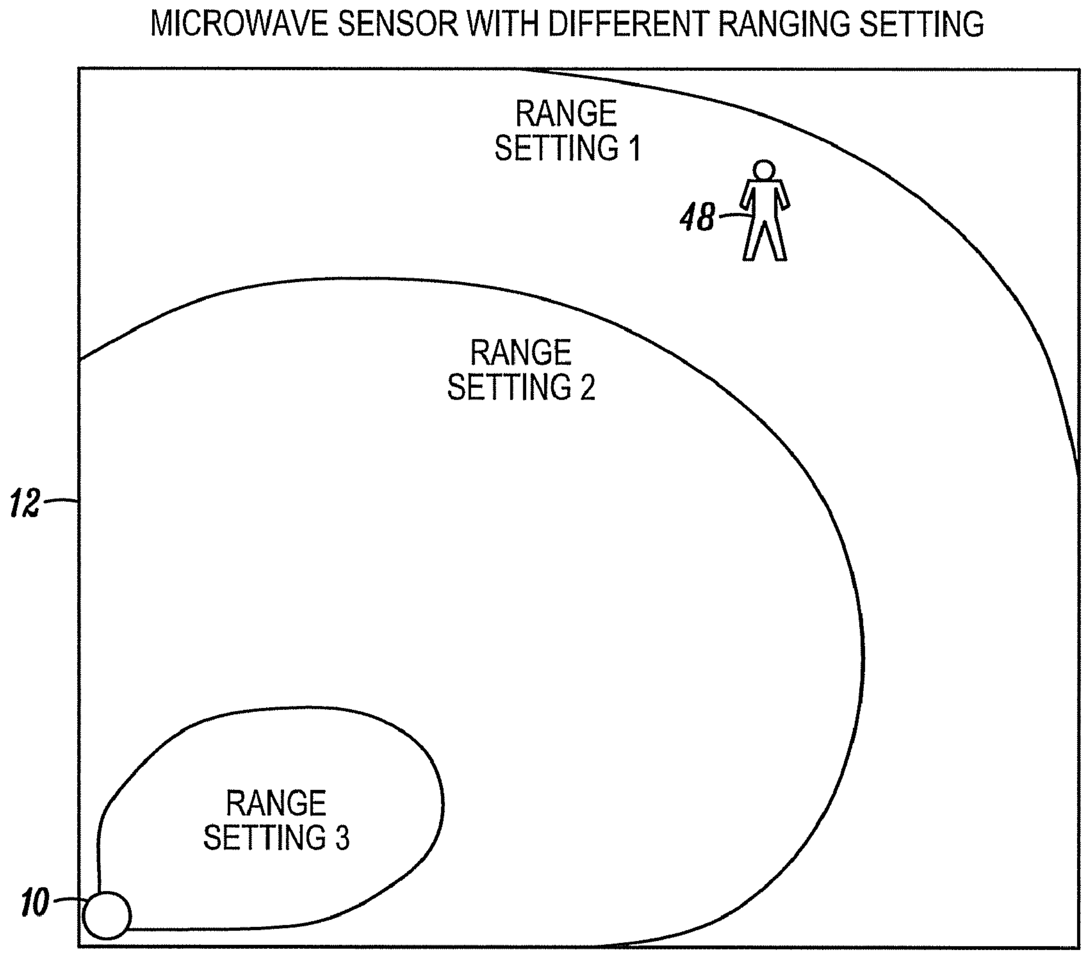
FIG. 1 shows a microwave intrusion detector in a context of use generally in accordance with an illustrated embodiment of the invention.

FIG. 1 shows an adaptive microwave security detector 10 in a context of use under an illustrated embodiment of the invention. As shown, the detector 10 functions to detect intruders within a secured area 12.

Figure 2:
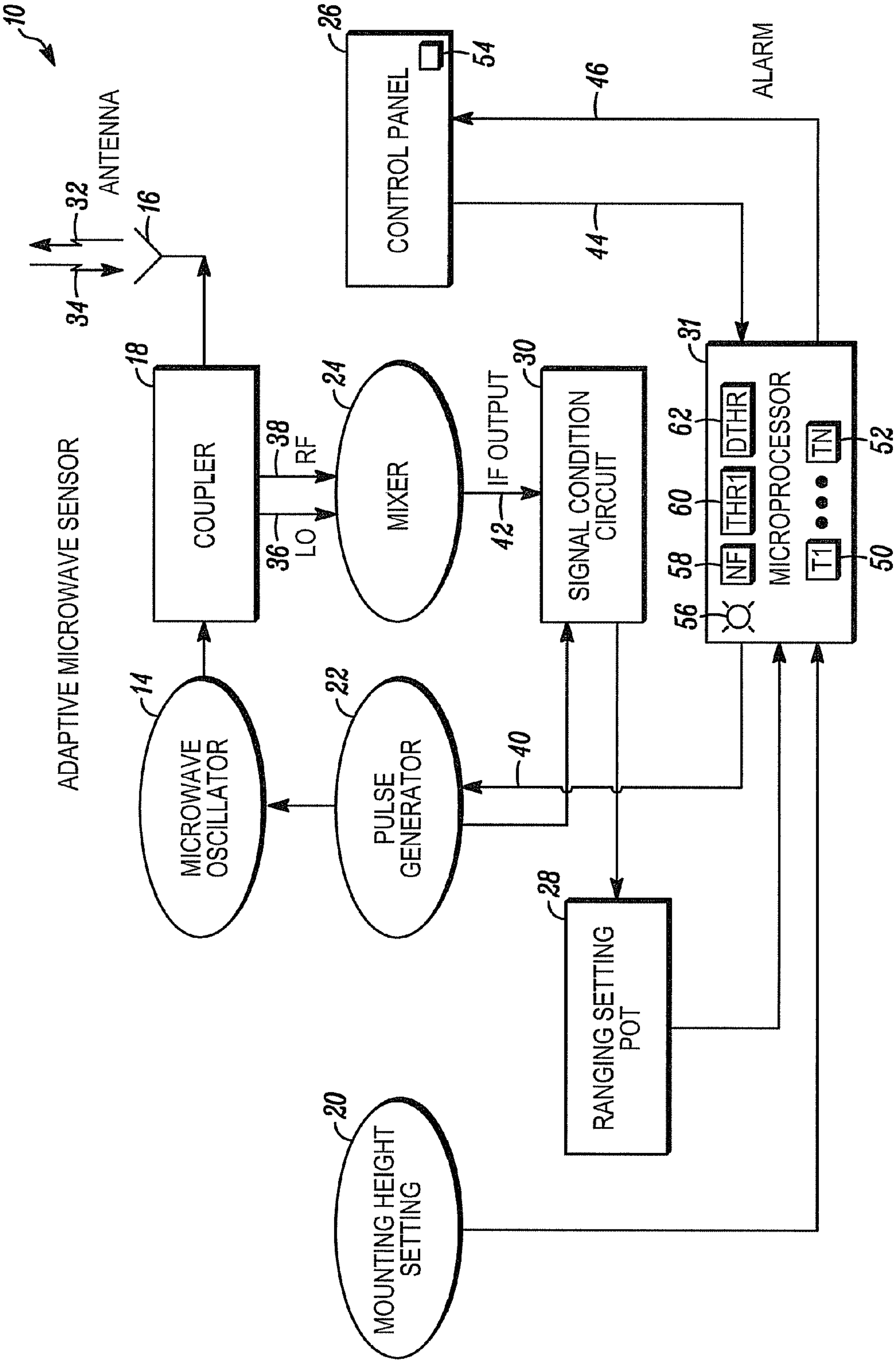
FIG. 2 is a block diagram of the intrusion detector of FIG. 1.

FIG. 2 is a block diagram of the microwave detector 10 of FIG. 1.

Figure 3:
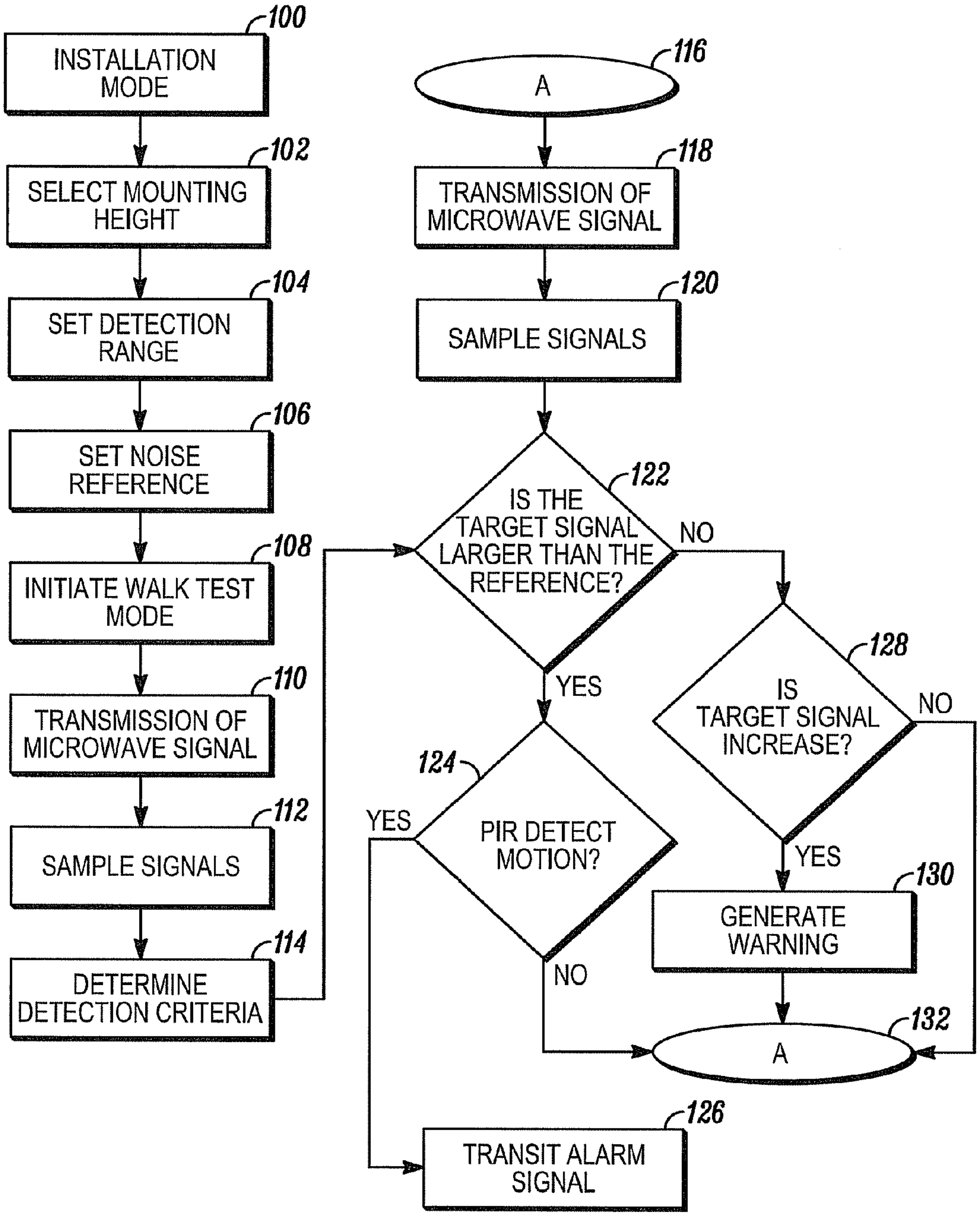
FIG. 3 is a flow chart of steps that may be followed by the detector of FIG. 1.

FIG. 3 is a flow chart of steps that may be executed within the detector 10.

Included within the microwave detector 10 may be a microwave oscillator 14 operating at an appropriate microwave frequency (for example, 24 GHz) that transmits a microwave signal 32 across the secured area 12 through an antenna 16 and a coupler 18. The coupler 18 not only couples the transmitted signal 32 to the antenna 16 but also couples a portion 36 of the transmitted signal 32 to a mixer 24. The coupler 18 also couples a portion 38 of a reflected signal 34 to the mixer 24.

The oscillator 14 may operate intermittently under control of a pulse from a pulse generator 22. In this case, the pulse from the pulse generator 22 is generated under control of a triggering signal 40 from a microprocessor 31.

The pulse from the pulse generator 22 is simultaneously applied to the microwave oscillator 14 and a signal conditioning circuit 30. In response, the oscillator 14 generates the microwave signal 32 transmitted across the secured area 12. At the same time, the signal conditioning circuit 30 may begin sampling an output IF signal of a mixer 24. The sampled output IF signal of the mixer 24 may then be filtered and amplified to remove any noise or other spectral components outside a base frequency (for example, $f<500$ Hz).

Within the mixer 24, the portion 36 of the transmitted signal 32 is mixed with the portion 38 of the reflected signal 34. The mixing of the portion 36 of the transmitted signal 32 with the portion 38 of the reflected signal 34 produces a Doppler frequency output signal 42.

The Doppler output signal 42 is scaled within a ranging setting potentiometer 28 and provided as an input 64 to the microprocessor 31. Similarly, a mounting height or elevation 20 of the detector 10 above the secured area 12 is provided as a second input to digital to analog (D/A) converter of the microprocessor 31.

The detector 10 may operate under control of a local or remote control panel 26. In this regard, the detector 10 may be activated by an arming signal 44 from the control panel 26. Similarly, intruders detected by the detector 10 may be reported as an alarm signal 46 to the control panel 26.

In the above embodiment, the transmitting antenna and receiving antenna are the same one. In another embodiment, the transmitting antenna and receiving antenna can be separated.

When a detector 10 is installed into a secured area 12, the operating characteristics of the detector 10 must be matched with the dimensions of the secured area. In the past, this problem has been solved by a sensitivity adjustment on the microwave intrusion detector by trial and error. Under illustrated embodiments of the invention, a much simpler solution is provided.

The solution to this problem is two-fold. First, a set-up technician enters 100 a set-up mode. Next, the technician may enter 102 a mounting height or elevation of the microwave detector 10 through the switch 20. The switch 20 may be any appropriate height selection device (e.g., a DIP switch, potentiometer, etc.).

The entry of the mounting height allows a selection processor inside the detector to select and retrieve a detection correction factor from a library of lookup tables 50, 52. The selected look-up table (e.g., 50) may contain a set of detection criteria correction factors optimized for a detector operating at the entered mounting height.

The set-up technician 48 may enter 104 a preliminary estimate of the maximum range from the detector to a distant end of the protected area through the range potentiometer 28 (i.e., Range Setting 1 in FIG. 1). The entry of a range setting allows the microprocessor 31 to record 106 an initial noise floor based upon a distance setting position of the potentiometer. Following entry of the estimate of maximum range, the set-up technician 48 may cause the detector to enter 108 a walk test mode by activating a button 54 or other feature on the control panel 26 or detector 10.

Once in the walk test mode, the detector 10 may begin transmitting 110 a microwave signal 32 and sampling 112 reflected signals 34. The technician or test subject may perform a walk-through of the secured area 12 by traversing the protected area 12 at a maximum range from the detector as shown in FIG. 1. If the detector 10 illuminates an indicator light or sound 56 indicating that the technician 48 was detected, the set-up process ends. If the detector 10 does not detect the technician, then the technician sets the range 28 to a higher value and repeats the process.

During the set-up process, the microprocessor 31 within the detector 10 may use the selected noise floor and may go on to perform an additional measurement of the noise floor 58 within the protected area 12 in an ambient state (i.e., without any people within the secured area 12) whenever the ranging setting potentiometer is adjusted. Once the noise floor 58 has been determined, the microprocessor 31 may then monitor the magnitude of an input signal level 64 for the detection of the technician as the technician does the walk-through. Monitoring for detection in this case means using a device such as a microprocessor to record the input signal level above the noise floor over a period of time. If the technician is detected, then the processor measures and saves the increase in the signal level above the noise floor produced by the presence of the technician. The signal level above the noise floor is saved as an intrusion reference threshold level 60 that is used in subsequent operation 114 as a basis for the detection of intrusions. The final threshold level 60 may be determined by both the reference threshold level and the selected criteria correction factor. For example, the final reference threshold level can be the maximum or average magnitude of a Doppler signal reflected from a test subject multiplied by a mounting height criteria correction factor.

As an alternative, the "look down" sensitivity of the detector 10 may be used as a first priority for setting the intrusion threshold level 60. In this case, the technician may set the range potentiometer 28 of the secured area for an appropriate value and test a sensitivity of the detector 10 by crawling across the protected area 12 directly below the detector 10. If the detector 10 detects the technician 48, the process ends with the microprocessor 31 saving the threshold value 60 determined under this method. If the detector 10 does not detect the technician, then the technician sets the range potentiometer 28 for a longer range and the technician repeats the process until the microprocessor 31 detects the technician.

Once set up, the detector 10 may be initialized 116 and begin transmitting 118 and receiving 120 microwave signals. The detector 10 may detect intruders under a process where the detector 10 continuously compares 122 a return signal with the predetermined threshold value 60. If a magnitude of the return signal exceeds the threshold 122, then the processor 31 may proceed with other tests to determine intrusion. For example, if the return signal exceeds the magnitude threshold 60, then the detector 10 may determine whether an infrared detector (not shown) has also detected 124 an intruder. If both microwave and PIR sensors detect motion, then an alarm will generated and the detector 10 may report 126 an alarm 46 to the control panel 26.

If a magnitude of the return Doppler signal exceeds the threshold while the PIR sensor does not detect any motion, then the processor 31 may proceed with other tests to detect intrusion. For example, the processor 31 may track the Doppler signal level when the ambient temperature is close to the human body temperature. If the Doppler signal keeps increasing and exceeds a predetermined value 62, then the detector 10 may report a warning 130/alarm 46 to the control panel 26.

If no warning/alarm is reported, then the detector 10 may continue 132 monitoring the area.

A specific embodiment of method and apparatus for detecting intruders has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of operating a microwave detector for detecting intruders within a secured area comprising:

automatically selecting a noise floor level of the microwave detector based upon a setting of a range setting potentiometer;

detecting a magnitude of a signal reflected from a test subject within the secured area that exceeds the selected noise floor; and establishing a threshold value for detecting an intruder based upon the magnitude of the detected signal, wherein the step of selecting the noise floor further comprises retrieving the noise floor from an output of an IF amplifier based upon the setting of the range setting potentiometer.

2. The method of operating the microwave detector as in claim 1 further comprising detecting an elevation of the detector above the secured area.

3. The method of operating the microwave detector as in claim 2 wherein the step of detecting the elevation further comprises reading a switch setting.

4. The method of operating the microwave detector as in claim 2 further comprising selecting a detection criteria correction factor from a lookup table based upon the detected elevation.

5. The method of operating the microwave detector as in claim 1 wherein the step of detecting the magnitude of the signal further comprises entering a test mode.

6. The method of operating the microwave detector as in claim 5 wherein the step of detecting the magnitude of the signal further comprises locating the test subject within the secured area at a maximum relative distance from the detector or directly underneath the sensor.

7. A microwave detector for detecting intruders within a secured area comprising:

means for selecting a noise floor based upon a setting of a range setting potentiometer;

means for detecting a magnitude of a signal reflected from a test subject within the secured area that exceeds the selected noise floor;

means for establishing a threshold value for detecting an intruder based upon the magnitude of the detected signal and a sensor mounting height or a detection criteria correction factor;

means for detecting an elevation of the detector above the secured area; and means for selecting the detection criteria correction factor from a lookup table based upon the detected elevation.

8. The microwave detector as in claim 7 wherein the means for detecting the elevation further comprises means for reading a switch setting.

9. The microwave detector as in claim 7 wherein the means for selecting the noise floor further comprises means for retrieving the noise floor from an output of an IF amplifier based upon the setting of the range setting potentiometer.

10. The microwave detector as in claim 7 wherein the means for detecting the magnitude of the signal further comprises means for entering a test mode.

11. The microwave detector as in claim 10 wherein the means for detecting the magnitude of the signal further comprises the test subject located within the secured area at a maximum relative distance from the detector or directly underneath the sensor.

12. A microwave detector for detecting intruders within a secured area comprising:

a noise floor determined from a setting of a range setting potentiometer;

a comparator that detects a magnitude of a signal reflected from a test subject within the secured area and that exceeds the selected noise floor; and a threshold value for detecting an intruder based upon the magnitude of the detected signal and a sensor mounting height or the magnitude of the detected signal and a detection criteria correction factor, wherein the setting of the range setting potentiometer includes a maximum relative distance in the secured area from the detector.

13. The microwave detector as in claim 12 wherein an elevation of the detector above the secured area is determined for determining the noise floor.

14. The microwave detector as in claim 13 wherein the elevation of the detector is determined by reading a switch setting.

15. The microwave detector as in claim 13 further comprising a selection processor that selects the detection criteria correction factor from one of a set of lookup tables based upon the detected elevation and noise floors based upon the setting of the range setting potentiometer.

16. The microwave detector as in claim 12 further comprising a test mode for detecting the threshold value.

* * * * *